US006783186B1

(12) United States Patent
McGanty

(10) Patent No.: US 6,783,186 B1
(45) Date of Patent: Aug. 31, 2004

(54) TWIST-FREE SEAT BELT

(76) Inventor: Leo Francis McGanty, 393 Palm Ave., San Jacinto, CA (US) 92582

( * ) Notice: Subject to any disclaimer, the term of this patent is extended or adjusted under 35 U.S.C. 154(b) by 0 days.

(21) Appl. No.: 10/213,513

(22) Filed: Aug. 6, 2002

(51) Int. Cl.⁷ .............................................. A47C 31/00
(52) U.S. Cl. ...................... 297/483; 297/468
(58) Field of Search ................. 297/468, 464, 297/466, 483; 280/801.1

(56) References Cited

U.S. PATENT DOCUMENTS 3,042,032 A * 7/1962 Vogel
3,291,528 A * 12/1966 Sencabaugh
6,343,841 B1 * 2/2002 Gregg et al.

* cited by examiner

Primary Examiner—Milton Nelson, Jr.

(57) ABSTRACT

The twist-free belt is so designed to eliminate the frustrating fumbling with a twisted seat belt and the resulting distraction that probably has caused many accidents. The twist-free seat belt avoids this defect by incorporating in its construction a slightly semicircular curved belt, causing it to resist twisting. The curve would be side to side, across the width of the belt. The flexible curve would flatten when pushed against the body, allowing a comfortable fit.

4 Claims, 1 Drawing Sheet

TWIST-FREE SEAT BELT

BACKGROUND OF THE INVENTION

This invention relates to an improvement on the present seat belt design in use on motor vehicles and other modes of transportation.

The seat belt now in use often becomes twisted while trying to engage it into the locked position. If it is badly twisted, it has to be disengaged and straightened before it can be properly placed across the body. Often a person using the seat belt will not bother with this corrective procedure and leave the twisted seat belt in place. This could not only be quite uncomfortable to the body, but it could be injurious to the body in the event of a collision.

Vehicle service manuals indicate that a twisted belt is an undesirable condition.

Occasionally upon disengagement, the seat belt, if badly twisted, will become jammed in the housing while retracting to its unused position. It can be a frustrating and time-consuming effort to free the seat belt from this jammed condition.

Although it is bad safety procedure, some drivers will proceed to drive off before fully engaging their seat belt. A twisted seat belt, occupying the attention of the driver at this particular moment, could result in a collision. The twist-free seat belt would also eliminate the task of running the belt between the fingers to undo any twist before engaging the belt. For these reasons and others, there is a well-defined need for a seat belt that will pull out of its housing without twisting.

SUMMARY OF THE INVENTION

The construction of the twist-free seat belt can be accomplished in several different ways. The curve or concavity, across the width of the belt, could be accomplished by weaving the seat-belt fabric around a curved framework of molded plastic, or a spring-metal wire, or other framework material. The curvature could also be formed by the manner in which a belt fabric is so woven that it creates the necessary curvature in the cross section of the belt. Such framework or weaving would have a crescent-like, semicircular shape.

It could also be accomplished by weaving plastic threads alongside the fabric thread material of the seat belt. The belt could then be run through heated forming dies to form the plastic threads to create the necessary curve. Whatever material is used, such material would have a memory that would force the belt to return to a semicircular configuration, when twisted otherwise.

The twist-free belt could have other applications, such as a cargo strapping, or an animal-restraining belt. It could be used wherever a twisting belt situation was undesirable.

BRIEF DESCRIPTION OF THE DRAWINGS

Advantages of this invention will become apparent to a person examining the illustrated embodiments in the following drawings.

DESCRIPTION OF THE PREFERRED EMBODIMENTS

Figure 1:
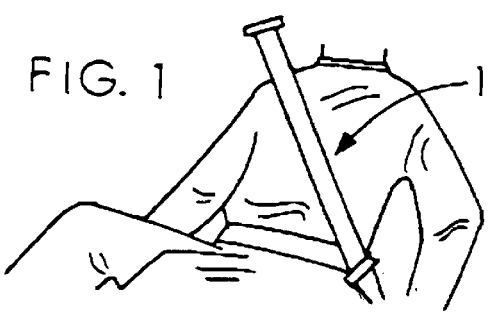
FIG. 1 is a perspective view showing a passenger in a vehicle with a twist-free seat belt 1 properly functioning in lay-flat manner.
Figure 2:
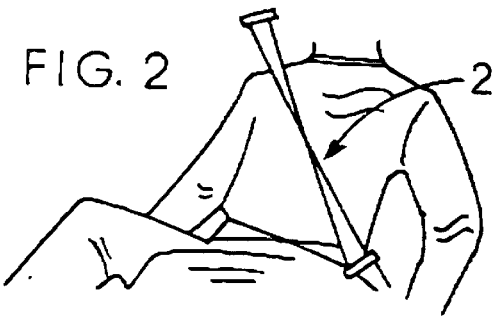
FIG. 2 is a perspective view showing a passenger in a vehicle with a twisted, malfunctioning seat belt 2 that is presently used.
Figure 3:
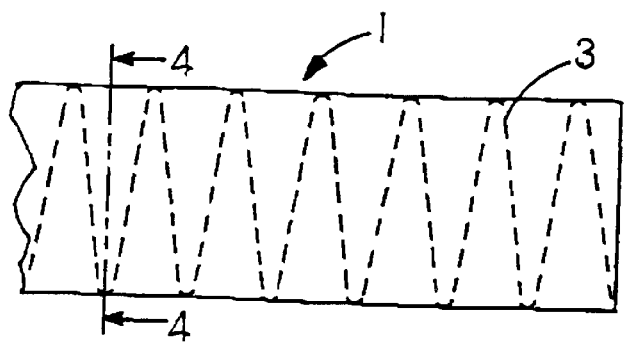
FIG. 3 is a plan view of a section of the seat belt 1 with the broken, zigzag lines representing a spring wire 3.
Figure 4:
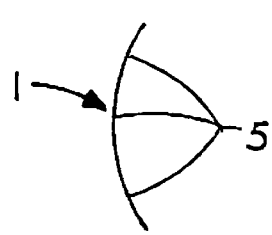
FIG. 4 is a sectional view of the curved seat belt viewed in the direction of the 4—4 arrows found in FIG. 3.

FIG. 1 shows the twist-free seat belt 1 properly seated against a passenger's chest in a desirable untwisted condition. FIG. 2 shows the presently used seat belt 2 in an undesirable, twisted condition that often happens. The twist-free seat belt 1 will always result in a flattened, untwisted seat belt against the chest of the passenger because of its construction. FIG. 3 shows a spring wire 3 framework zigzagging through the seat belt 1. This, of course, is only one of many wire configurations and materials that could be used to accomplish the purpose of the twist-free seat belt. FIG. 4 shows a section view 4—4, showing the desirable curvature or concavity 5 of the belt that would maintain a twist-free belt condition. Other configurations could be used, such as a flat or ribbed belt and other designs, maybe not as advantageously as the semicircular curve 5, but all having as the main objective, to be a non-twisting belt. One method of manufacture, among many, would be to form the spring wire 3 with forming dies, then weave a fabric, or some other type fiber, around the wire to complete the twist free belt. A framework of molded plastic incorporating the curvature as seen in FIG. 4 could be used and a fabric or fiber could be woven about the plastic framework.

What is claimed is:

1. A twist-free seat belt used for restraining purposes, said belt having a flexible, curved, semicircular, cross-section, said seat belt being made from a material having a molecular memory therein, so that, when said seat belt is twisted, said seat belt will resist being twisted and return to its untwisted position, said belt being made with one of a structure of a fabric woven around a curved, spring-metal frame; a structure of fabric woven around a curved, plastic frame; a structure of solid plastic material; a fiber material, so woven so that a cross-sectional curvature would be formed.

2. A twist-free seat belt device as defined in claim 1, said belt being made with a structure of fabric woven around a curved, plastic frame.

3. A twist-free seat belt device as defined in claim 1, said belt being made with a structure of solid plastic material.

4. A twist-free seat belt device as defined in claim 1, said belt being made with a fiber material, so woven so that a cross-sectional curvature would be formed.

* * * * *